US006772280B1

United States Patent
Kamijo (10) Patent No.: US 6,772,280 B1
(45) Date of Patent: Aug. 3, 2004

(54) FIRST-IN FIRST-OUT STORAGE DEVICE

(75) Inventor: Hirofumi Kamijo, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 09/763,231

(22) PCT Filed: Jun. 22, 2000

(86) PCT No.: PCT/JP00/04082

§ 371 (c)(1),
(2), (4) Date: Feb. 20, 2001

(87) PCT Pub. No.: WO00/79378

PCT Pub. Date: Dec. 28, 2000

(30) Foreign Application Priority Data

Jun. 22, 1999  (JP) ............................................ 11-175534

(51) Int. Cl.[7] ............................................... G06F 12/00
(52) U.S. Cl. ......................................... 711/110; 710/57
(58) Field of Search ............................. 711/110; 710/57

(56) References Cited

U.S. PATENT DOCUMENTS 5,901,100 A * 5/1999 Taylor ........................ 365/219

FOREIGN PATENT DOCUMENTS

| JP | 54-156433 A | 12/1979 |
|---|---|---|
| JP | 58-075244 A | 5/1983 |
| JP | 63-268334 A2 | 11/1988 |
| JP | 02-018613 A | 1/1990 |
| JP | 02-019921 A | 1/1990 |
| JP | 02-201537 A | 8/1990 |
| JP | 2-202629 A2 | 10/1990 |
| JP | 03-100851 A | 4/1991 |
| JP | 04-112319 A | 4/1992 |

OTHER PUBLICATIONS

English translation of JP 02–019921, Nov. 2002.*
English translation of JP 02–201537, Nov. 2002.*
English translation of JP 04–112319, Nov. 2002.*
English translation of JP 58–075244, Nov. 2002.*
English translation of JP 54–156433, Nov. 2002.*
English translation of JP 02–018613, Nov. 2002.*
English translation of JP 03–100851, Nov. 2002.*
English translation of JP 02–202629, Nov. 2002.*

* cited by examiner

Primary Examiner—Matthew Kim
Assistant Examiner—Woo H. Choi
(74) Attorney, Agent, or Firm—Oliff & Berridge, PLC (57) ABSTRACT

A first-in first-out (FIFO) storage device for storing data including continuous identical values, which is reduced in a required circuit scale and increased in a reading operation speed, and which comprises a memory region (13) provided with a counter unit and a data unit corresponding to a plurality of addresses, a comparison unit (11) for checking whether or not a new input data is identical with an input data one data ahead of the new one, and a write control unit (12) for controlling, based on the checked result by the comparison unit (11), to write the current input data into a new address in the data unit of the memory region (13) when the new input data is not identical with the one-data-ahead input data and for controlling to count up a count value in a one-address-ahead address in the counter unit of the memory region (13) when the two data are identical with other.

14 Claims, 12 Drawing Sheets

FIRST-IN FIRST-OUT STORAGE DEVICE

TECHNICAL FIELD

The present invention relates to a first-in first-out storage device. In particular, the invention relates to a first-infirst-out storage device (FIFO) having compression and expansion functions.

BACKGROUND OF ART

In conventional first-in first-out storage devices (FIFOs), input data are stored at addresses that are determined according to the order of input of the input data. Therefore, a conventional FIFO can store at most data of an amount that is equal to its capacity.

Japanese Patent Application Laid-Open No. 2-202629 discloses a data buffer with a compression function that is improved in the above point. In this data buffer, the same, consecutive data are compressed into single data and loaded into a first FIFO and the identifier of a counter that has counted the number of same, consecutive data is loaded into a second FIFO, whereby the capacity of the first FIFO is reduced.

Figure 12:
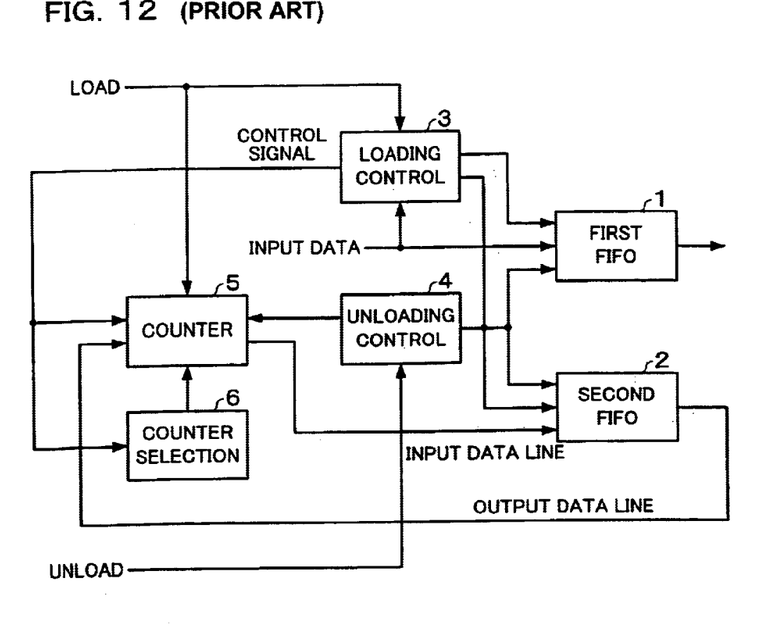
FIG. 12 is a block diagram of a conventional data buffer.

The configuration and operation of this data buffer will be described with reference to FIG. 12. When input data are the same, consecutive data, a loading control circuit 3 stops sending the same data to a first FIFO 1. At the same time, a counter circuit 5 and a counter selection circuit 6 recognize occurrence of the same, consecutive data based on a control signal that is supplied from the loading control circuit 3 and count the number of occurrence of the same data based on the occurrence coefficient of load signals. Also at the same time, a counter selection circuit 6 generates an identifier for selecting one of the counters in the counter circuit 5 and loads the identifier of the selected counter into a second FIFO 2 via an input data line. At the time of unloading, the identifier of a counter that counted the number of consecutive occurrence of the same data is output from the second FIFO 2 to a output data line and unloading from the first FIFO 1 is stopped by an unloading control circuit 4 until the count value being held by the counter concerned becomes zero.

However, this data buffer requires the counter selection circuit 6 for generating an identifier for selecting one of the counters in the counter circuit 5 and the second FIFO 2 for storing the identifier of a selected counter, and hence the circuit scale cannot be reduced sufficiently. There is another problem that the unloading operation is complex and hence it is difficult to increase the speed of the reading operation.

DISCLOSURE OF INVENTION

To solve the above problems, a first-in first-out storage device according to the present invention comprises:

a memory area having a plurality of addresses and comprising a counter section and a data section corresponding to each of the addresses;

a comparison section which detects whether new input data and immediately preceding data are identical or not; and a writing control section which performs control based on a detection result of the comparison section, so that the new input data is written into the data section of the memory at a new address when the new input data and the immediately preceding input data are different from each other, and so that a count value of the counter section of the memory area at an address where the immediately preceding input data has been stored is incremented when the new input data and the immediately preceding input data are identical.

The writing control section may perform control so that the new input data is written into the data section of the memory area at a new address when the new input data and the immediately preceding input data are identical and the count value of the counter section of the memory area at the address where the immediately preceding input data was written is equal to a maximum value.

Further, the first-in first-out storage device may further comprise a reading control section which performs control so that data stored in the data section of the memory area at a read address is read out once when the count value of the counter section of the memory area at the read address is equal to a predetermined value, and so that data stored in the data section of the memory area at a read address is repeatedly read out a number of times that is determined based on the count value when the count value of the counter section of the memory area at the read address is other than the predetermined value other than the predetermined value.

The first-in first-out storage device may further comprise a management section which outputs a signal for stopping a writing operation when data is stored in the data section of the memory area at all the addresses and the new input data and the immediately preceding data are different from each other or the count value of the counter section at a last-written address is equal to a maximum value.

On the other hand, the first-in first-out storage device may further comprise a management section which outputs a signal for stopping a reading operation when the number of data that has been read from the memory area becomes equal to the number of data that has been stored in the memory area.

The first-in first-out storage device may further comprise a management section which outputs a signal for stopping a writing operation when data that has not been read out yet are stored in the data section of the memory area at all the addresses.

The first-in first-out storage device may further comprise a management section which outputs a signal for stopping a reading operation when a last-read address of the memory area is the same as a last-written address of the memory area and the count value of the counter section is equal to the predetermined value.

According to the above-configured first-in first-out storage device of the present invention, it is not necessary to separately provide a counter selection circuit for generating an identifier of a counter that is used conventionally and a second memory for storing the identifier. By providing the counter section and the data section in a single memory so that they correspond to respective addresses, the scale of a circuit that is necessary for storing the same and consecutive data can be reduced greatly. Further, the reading operation can be made faster than in the case of using two memories and identifiers.

BEST MODE FOR CARRYING OUT THE INVENTION

Embodiments of the present invention will be hereinafter described with reference to the drawings.

1. First Embodiment

Figure 1:
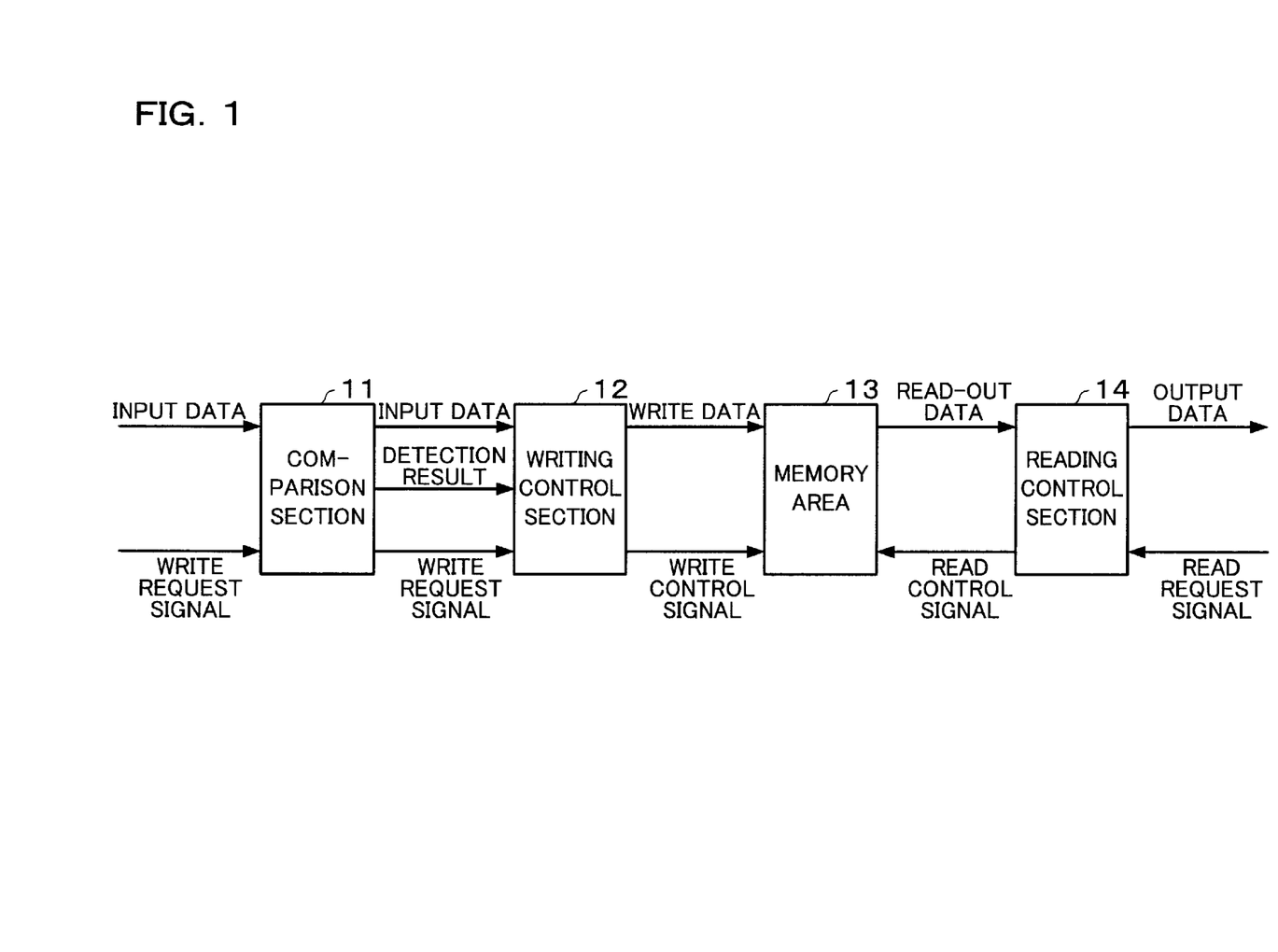
FIG. 1 is a block diagram of a first-in first-out storage device according to a first embodiment.

FIG. 1 is a block diagram of a first-in first-out storage device according to a first embodiment of the present invention. As shown in FIG. 1, the first-in first-out storage device has a comparison section 11 for detecting whether consecutive input data are identical, a writing control section 12 for controlling a writing operation based on a detection result of the comparison section 11, a first-in first-out memory area 13 that is provided with counter sections and data sections that correspond to a plurality of addresses, and a reading control section 14 for controlling a reading operation.

Figure 2:
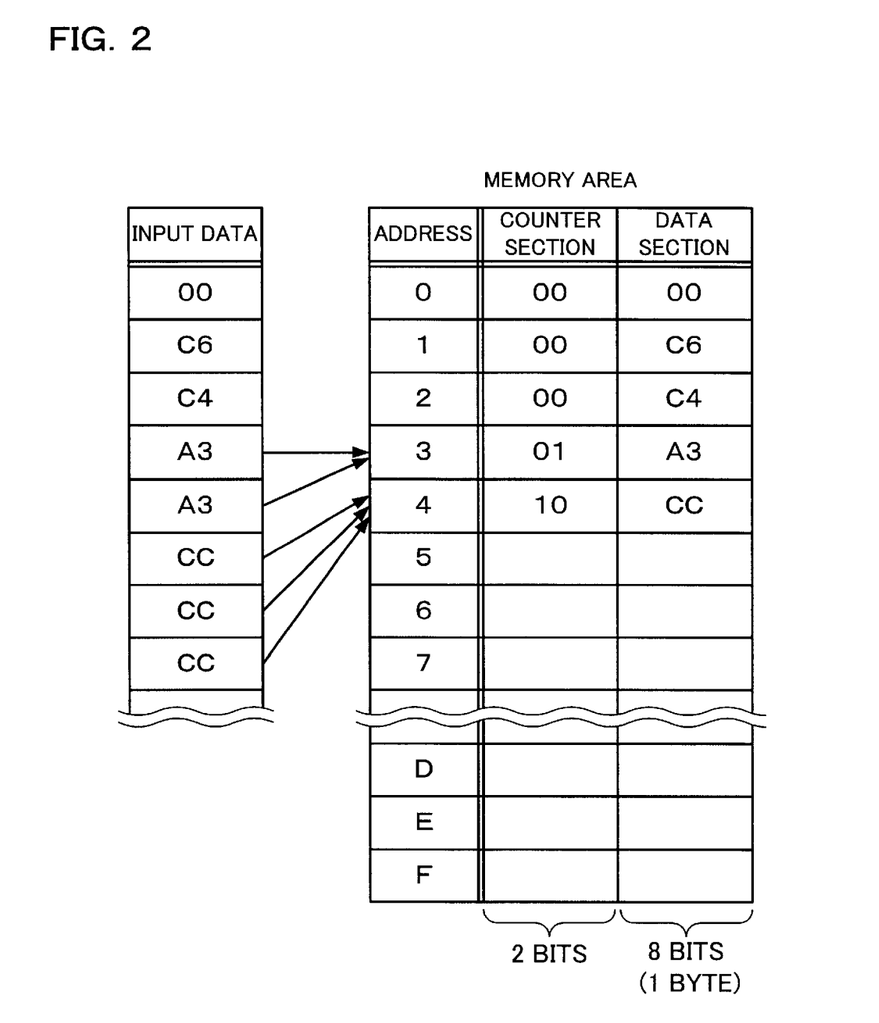
FIG. 2 shows a first-in first-out memory area used in the first-in first-out storage device of FIG. 1.

The operation of the first-in first-out storage device having the above configuration will be described below in detail with reference to FIG. 2.

The comparison section 11 starts processing of input data in response to a write request signal. Specifically, the comparison section 11 compares the current input data that has newly been input externally with the immediately preceding input data, detects whether they are identical, and outputs a detection result together with the input data.

Figure 3:
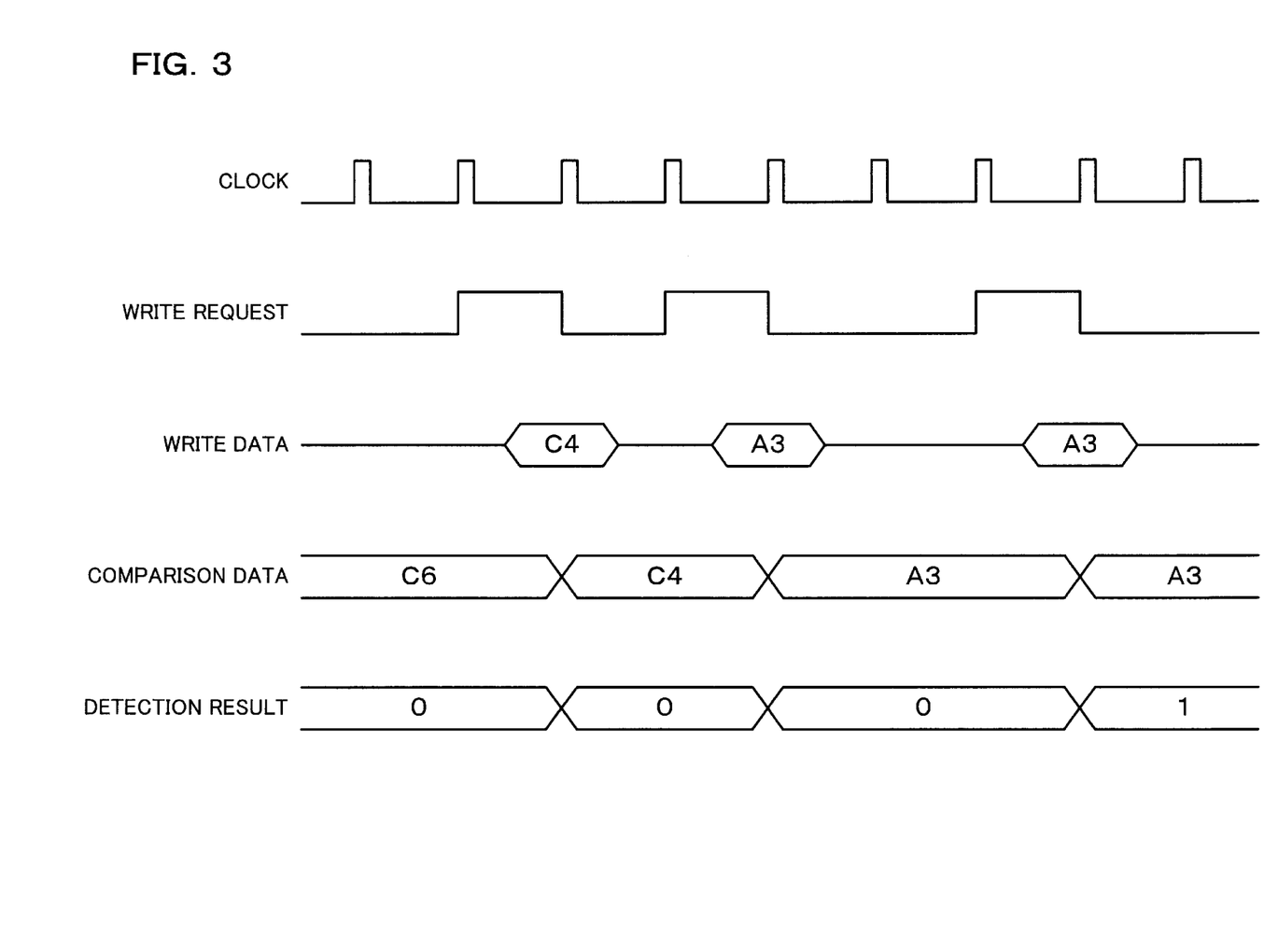
FIG. 3 is a timing chart showing an example of operation of a comparison section shown in FIG. 1.

This operation will be described by using an example that is shown in FIG. 3 in the form of a timing chart. When receiving a write request signal, the comparison section 11 captures, in synchronism with the next clock, write data (e.g., C4) that is the current input data and holds it, compares it with the immediately preceding input data (e.g., C6) that remains as comparison data, produces an output (e.g., "0") indicating that the two data are different from each other to the writing control section 12 as a detection result, and holds the write data C4 by substituting it for the previous comparison data. When the same write data occur consecutively, for example, when input data A3 is input second time as shown in FIG. 3, the comparison section 11 compares it with the immediately preceding input data A3 that remains as comparison data and produces an output (e.g., "1") indicating that the two data are identical to the writing control section 12 as a detection result.

Based on the detection result of the comparison section 11, the writing control section 12 controls the memory area 13 by using a write control signal. Specifically, in the example of FIG. 2, if the current input data are different from their immediately preceding input data, respectively, the writing control section 12 sequentially writes the current input data (00, C6, C4, and A3) to data sections of the memory area 13 at respective addresses and makes the count values of counter sections "00". On the other hand, if the current input data (second A3) is the same as the immediately preceding input data (first A3), the writing control section 12 increments the count value of the counter section to "01" at the address (3) where the immediately preceding input data was stored but does not write the current input data (second A3). In this example, the count value is expressed by 2 bits and the data is expressed by 8 bits (1 byte). Therefore, in the above case, the data of 2 bytes in total were stored in a memory of 1 byte and 2 bits (10 bits in total).

Next, the operation of reading out stored data will be described. In response to a read request signal, the reading control section 14 controls the memory area 13 by using a read control signal. Specifically, in the example of FIG. 2, if the count values of counter sections of the memory area 13 are "00", the reading control section 14 sequentially reads data (00, C6, and C4) from the data sections at the respective addresses. On the other hand, if the count value is not equal to "00", the reading control section 14 repeatedly reads the same data additionally a number of times that is equal to the count value. For example, if the count value is "01", the reading control section 14 reads out the same data (A3) twice in total. If the count value is "10", the reading control section 14 reads out the same data (CC) three times in total.

According to this embodiment, since the counter sections and the data sections are provided so as to correspond to the respective addresses of the single first-in first-out memory area, it is not necessary to separately provide a counter selection circuit for generating an identifier of a counter and a second memory area for storing an identifier that are disclosed in Japanese Patent Application Laid-Open No. 2-202629 and hence the scale of a circuit that is necessary to store the same, consecutive data can be reduced greatly. Further, the invention can make the reading operation faster than in the case of using two memory areas and identifiers.

2. Second Embodiment

Next, a second embodiment of the present invention will be described. Only different points from the first embodiment will be described below. The second embodiment is the same as the first embodiment except for the points described below. The components of the second embodiment having corresponding components in the first embodiment will be given the same reference numerals as the latter.

Figure 4:
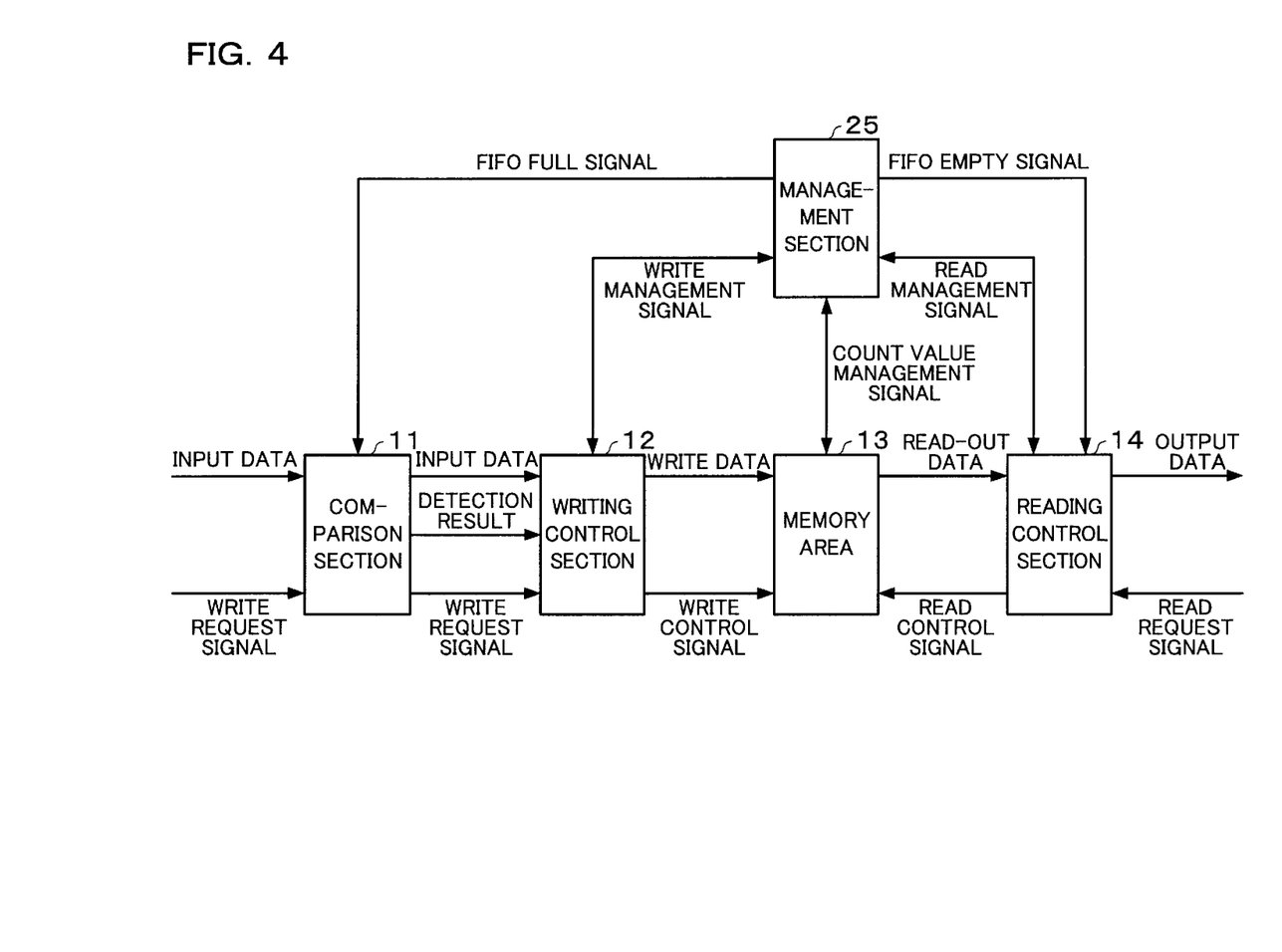
FIG. 4 is a block diagram of a first-in first-out storage device according to a second embodiment.

FIG. 4 is a block diagram of a first-in first-out storage device according to the second embodiment of the present invention. In this embodiment, a management section 25 for managing free space is added to the first-in first-out storage device according to the first embodiment shown in FIG. 1.

The management section 25 shown in FIG. 4 recognizes that the memory area 13 is full and outputs a FIFO full signal if the data sections of the memory area 13 are in a maximum storage state (i.e., data are stored in the data sections at all addresses) and if the current input data is different from the immediately preceding input data or the count value of the counter section having the last address is equal to the maximum value though the current input data is the same as the immediately preceding input data. In response, the comparison section 11 stops comparing input data and the writing control section 12 stops the data writing operation. Further, the management section 25 manages the number of data that have been stored in the memory area 13. If the number of data that have been read from the memory area 13 becomes equal to the number of data that have been stored in the memory area 13, the management section 13 recognizes that the memory area 13 is empty and outputs a FIFO empty signal. In response, the reading control section 14 stops the data reading operation.

Figure 5:
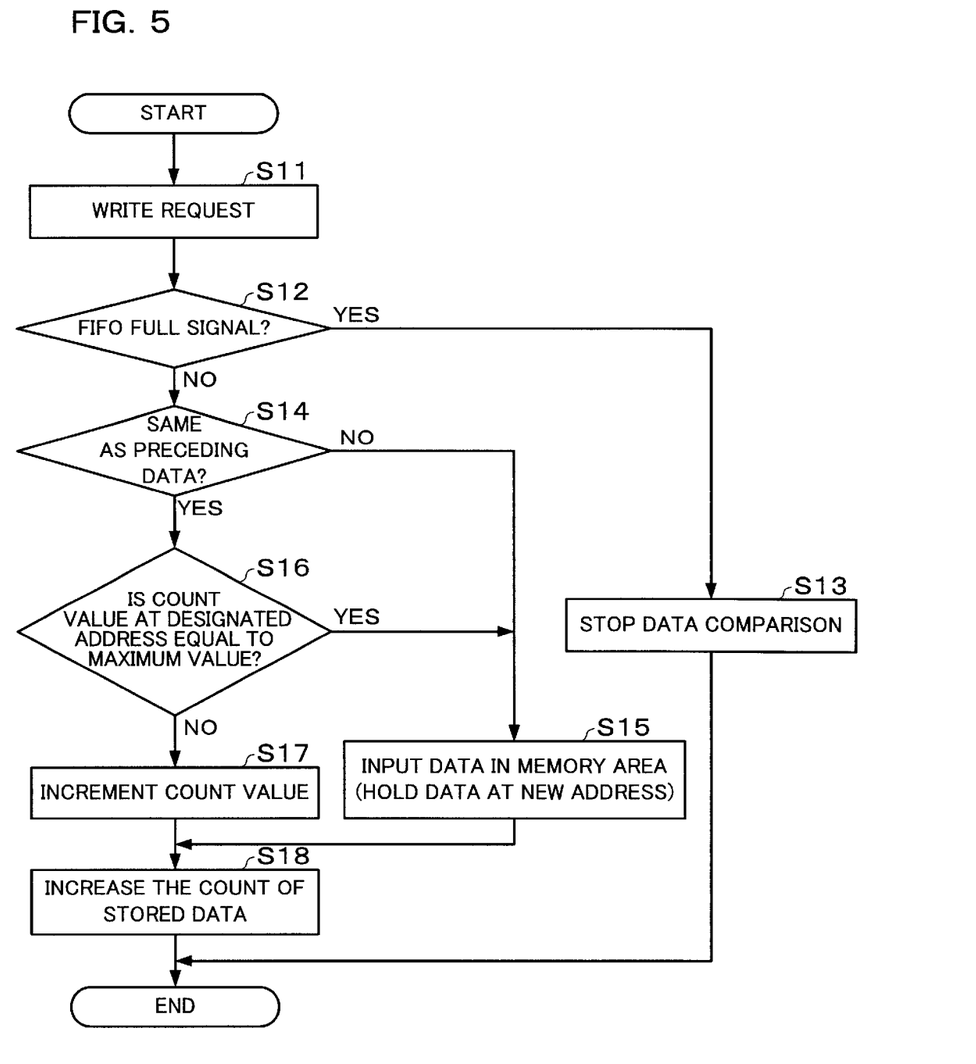
FIG. 5 is a flowchart showing a data writing operation of the first-in first-out storage device of FIG. 4.

The writing operation of the first-in first-out storage device having the above configuration will be described below in detail with reference to a flowchart of FIG. 5.

In response to a write request signal, the comparison section 11 starts processing of input data (step S11). First, it is judged whether a FIFO full signal exists (step S12). If a FIFO full signal exists, the data comparison operation is stopped (step S13). On the other hand, if a FIFO full signal does not exist, the current input data is compared with the immediately preceding input data (step S14). If they are different from each other, the writing control section 12 writes the current input data to a data section of the FIFO 13 at a new address (step S15). On the other hand, if they are identical, the writing control section 12 designates an address where the immediately preceding input data was stored and it is judged whether the count value of the counter section is equal to the maximum value (step S16). If the count value is equal to the maximum value, the current input data is written to a data section at a new address (step S15). On the other hand, the count value is not equal to the maximum value, the count value of the counter section at the address where the immediately preceding input data was stored is incremented (step S17) After the execution of step S15 or S17, the management section 25 increases the number of stored data (step S18).

Figure 6:
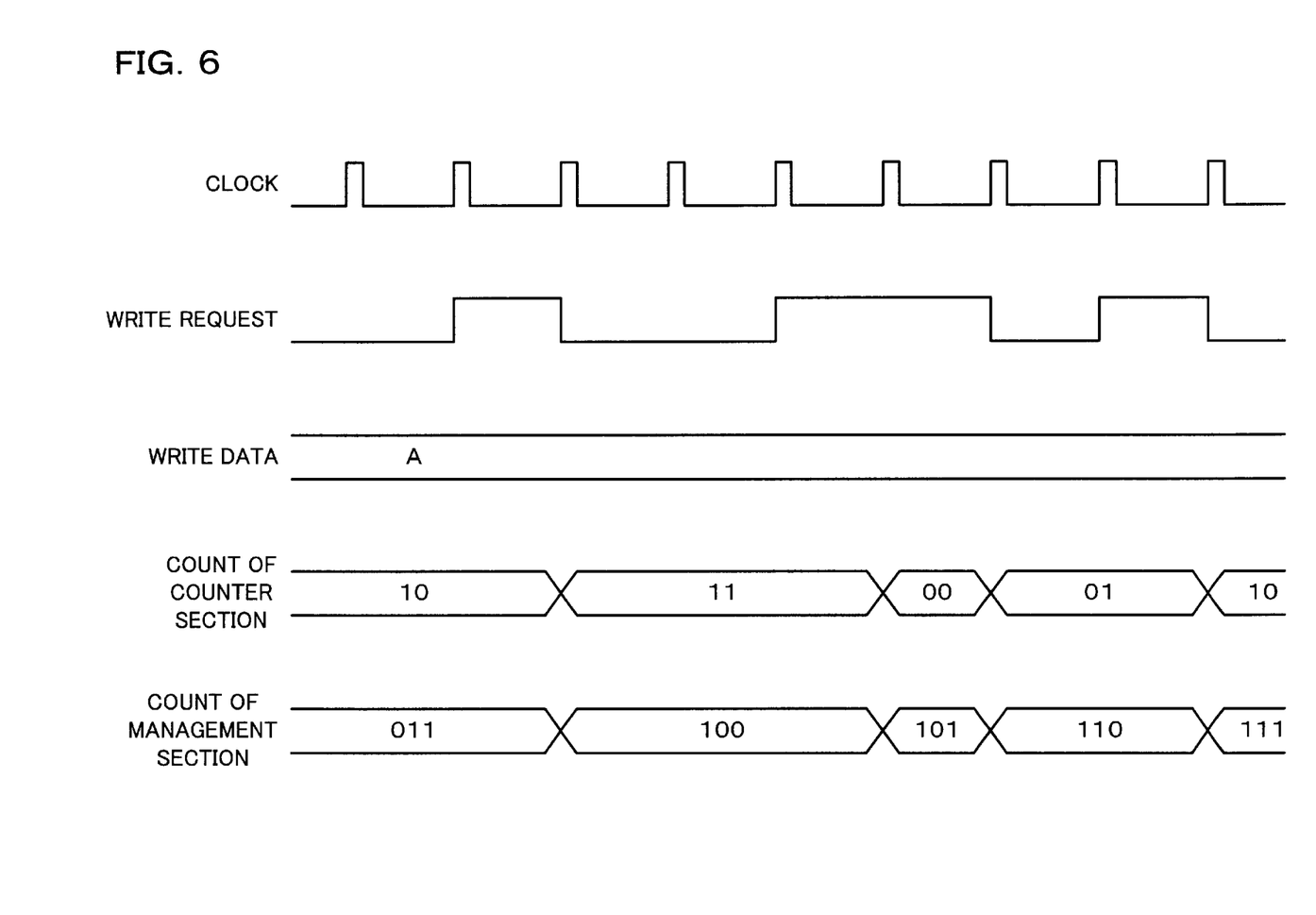
FIG. 6 is a timing chart showing an example of writing operation of the first-in first-out storage device of FIG. 4.

FIG. 6 is a timing chart showing an example of writing operation in which a FIFO full signal is not output from the management section 25 and data A is written consecutively. In this example, the fact that the write data A as the current input data is the same as the immediately preceding input data A is detected by the comparison section 11 every time a write request arrives. The writing control section 12 increments the count value of the counter section of the memory area 13 at the current address every time a write request arrives until the above count value becomes equal to the maximum value that is "11". If the count value of the counter section has become the maximum value of "11", when the next write request occurs the current input data A is written to the data section of the memory area 13 at the next address. If the input data A still continues to occur, the writing control section 12 increments, in the same manner as described above, the count value of the counter section of the memory area 13 at the address concerned every time a write request arrives until the above count value becomes equal to the maximum value. The count of the management section 25 is increased every time a write request arrives unless a FIFO full signal is output.

Figure 7:
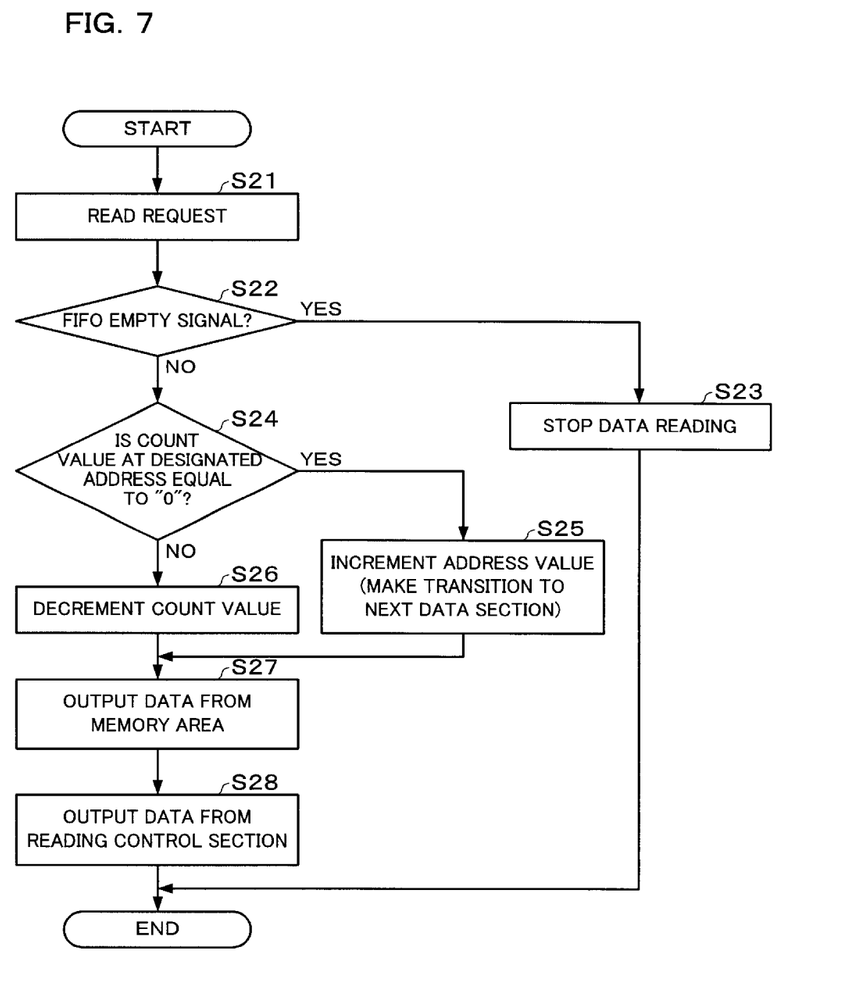
FIG. 7 is a flowchart showing a data reading operation of the first-in first-out storage device of FIG. 4.

Next, the operation of reading out stored data will be described below with reference to a flowchart of FIG. 7.

In response to a read request signal, the reading control section 14 starts an operation of reading out stored data (step S21). First, it is judged whether a FIFO empty signal exists that is to be output from the management section 25 (step S22) If a FIFO empty signal exists, the data reading operation is stopped (step S23). On the other hand, if a FIFO empty signal does not exist, it is judged whether the count value that is set in the counter section of the memory area 13 at a designated address is equal to "0" (step S24). If the count value is equal to "0", the read address value is incremented and a transition is made to the next data section (step S25). If the count value is not equal to "0", the count value is decremented (step S26) After the execution of step S25 or S26, data is output from the memory area 13 (step S27) and is further output from the reading control section 14 (step S28).

Figure 8:
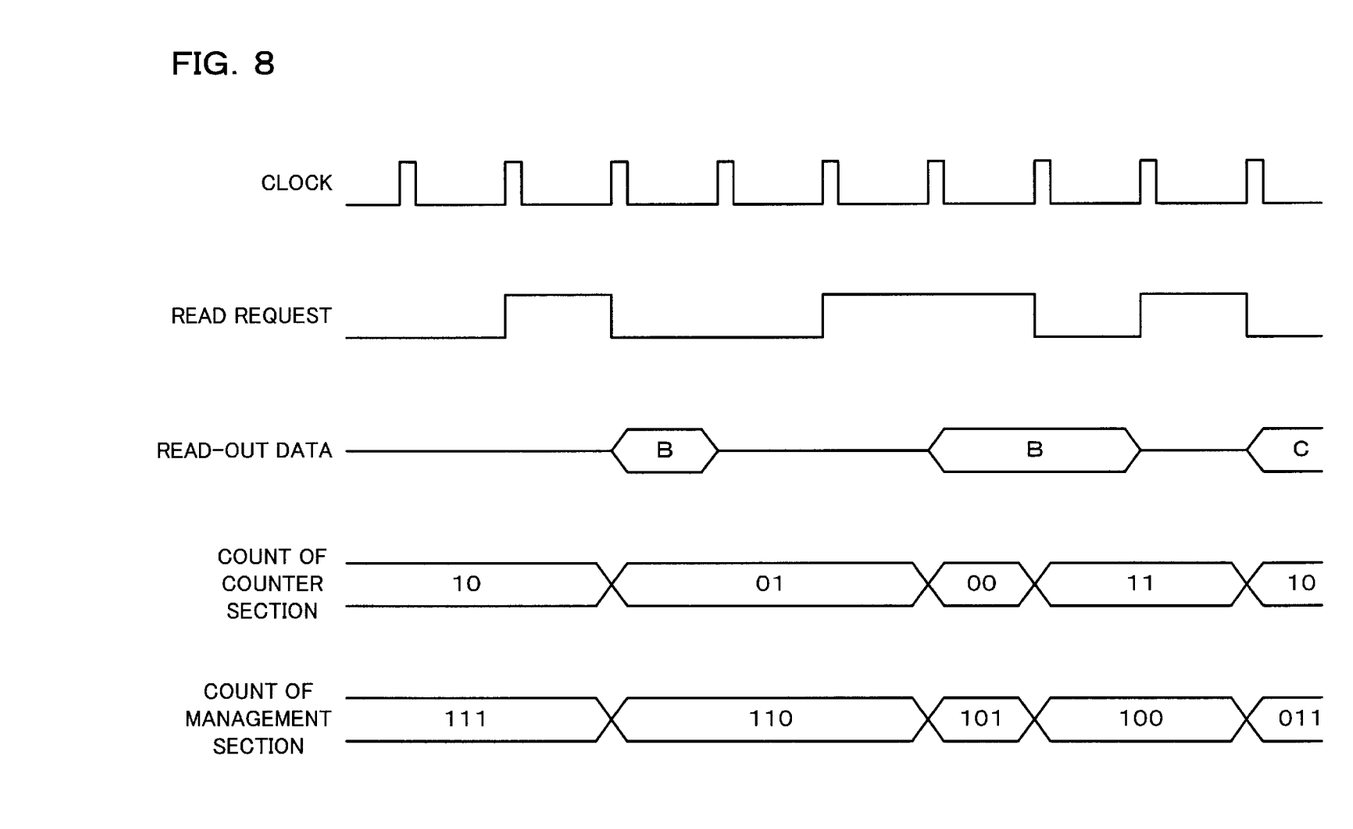
FIG. 8 is a timing chart showing an example of reading operation of the first-in first-out storage device of FIG. 4.

FIG. 8 is a timing chart showing an example of reading operation. In this example, since a FIFO empty signal is not output from the management section 25, the reading control section 14 starts a reading operation in response to a read request signal. Since the count value of the counter section at the current read address of the memory area 13 is "10" and not "00", the count value of the counter section is decremented to "01" and the count value of the management section is decremented to "110". Data B is output from the memory area and is further output from the reading control section 14. As the reading continues in the above manner, in this example, when data B is read out third time, the count value of the counter section at the current address is equal to "00" and hence the read address value is incremented. In this example, the count value of the counter section at the resulting address is equal to "11". Upon occurrence of the next read request signal, data C is read from the data section at the incremented address and the count value of the counter section at the same address is decremented to "10". The count value of the management section 25 is decremented every time data of 1 byte is read out.

In addition to the advantages of the first embodiment, this embodiment provides an advantage that whether the memory area has free space can be recognized correctly at the time of data writing. Further, since the management section performs management based on presence/absence of effective data in the data sections of the memory area and count values of the counter sections, the management section can recognize the number of effective data in the memory area in consideration of the count values. This is effective in transferring a plurality of data simultaneously at the time of data reading.

3. Third Embodiment

Next, a third embodiment of the present invention will be described. Only different points than in the first embodiment will be described below. The third embodiment is the same as the first embodiment except for the points described below. The components of the third embodiment having corresponding components in the first embodiment will be given the same reference numerals as the latter.

Figure 9:
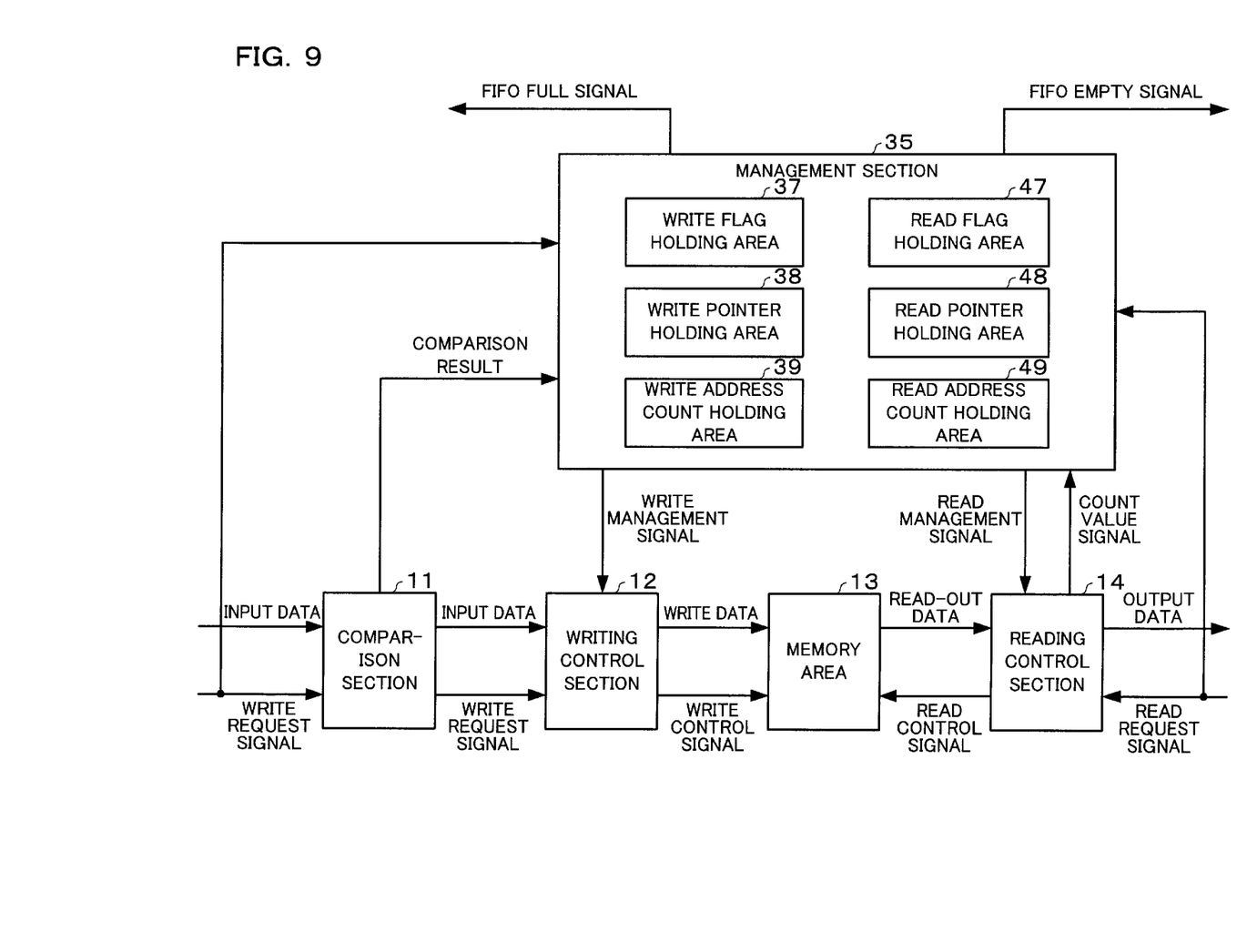
FIG. 9 is a block diagram of a first-in first-out storage device according to a third embodiment.

FIG. 9 is a block diagram of a first-in first-out storage device according to the third embodiment of the present invention. In this embodiment, a management section 35 is added to the first-in first-out storage device according to the first embodiment shown in FIG. 1.

The management section 35 is different from the management section 25 of the second embodiment in the following points. That is, the management section 35 includes a write flag holding section 37 for holding a write flag that indicates whether the writing belongs to an odd-numbered or even-numbered circulation in the memory area, a write pointer holding section 38 for holding a write pointer value that indicates a write address, a write address count holding section 39 for holding the count value of the counter section at a write address, a read flag holding section 47 for holding a read flag that indicates whether the reading belongs to an odd-numbered or even-numbered circulation in the memory area, a read pointer holding section 48 for holding a read pointer value that indicates a read address, and a read address count holding section 49 for holding the count value of the counter section at a read address. A write request signal, a comparison result signal that is output from the comparison section 11, a read address count signal that is output from the reading control section 14, and a read request signal are input to the management section 35. The management section outputs a write management signal that is supplied to the writing control section 12, a read control signal that is supplied to the reading control section 14, a FIFO full signal, and a FIFO empty signal.

The write flag holding section 37 holds a 1-bit write flag that is inverted to "00" or "1" every time the write address of the memory area 13 returns to the head address. The write flag holding section 37 holds "0" in a state that the first-in first-out storage device 30 is reset.

The write pointer holding section 38 holds data of 8 bits, for example, that indicates an address of the memory area 13 at which data was written last. The write pointer holding section 38 holds a value (e.g., "0") corresponding to the head address in a state that the first-in first-out storage device 30 is reset.

The write address count holding section 39 holds a count value of 2 bits, for example, of the counter section at an address indicated by the write pointer. The write address count holding section 39 holds "0" in a state that the first-in first-out storage device 30 is reset.

The read flag holding section 47 holds a 1-bit read flag that is inverted to "0" or "1" every time the read address of the memory area 13 returns to the head address. The read flag holding section 47 holds "0" in a state that the first-in first-out storage device 30 is reset.

The read pointer holding section 48 holds data of 8 bits, for example, that indicates an address of the memory area 13 at which data was read out last. The read pointer holding section 48 holds a value (e.g., "0") corresponding to the head address in a state that the first-in first-out storage device 30 is reset.

The read address count holding section 39 holds a count value (e.g., 2-bit data) of the counter section at an address indicated by the read pointer. The write address count holding section 39 holds "0" in a state that the first-in first-out storage device 30 is reset.

Figure 10:
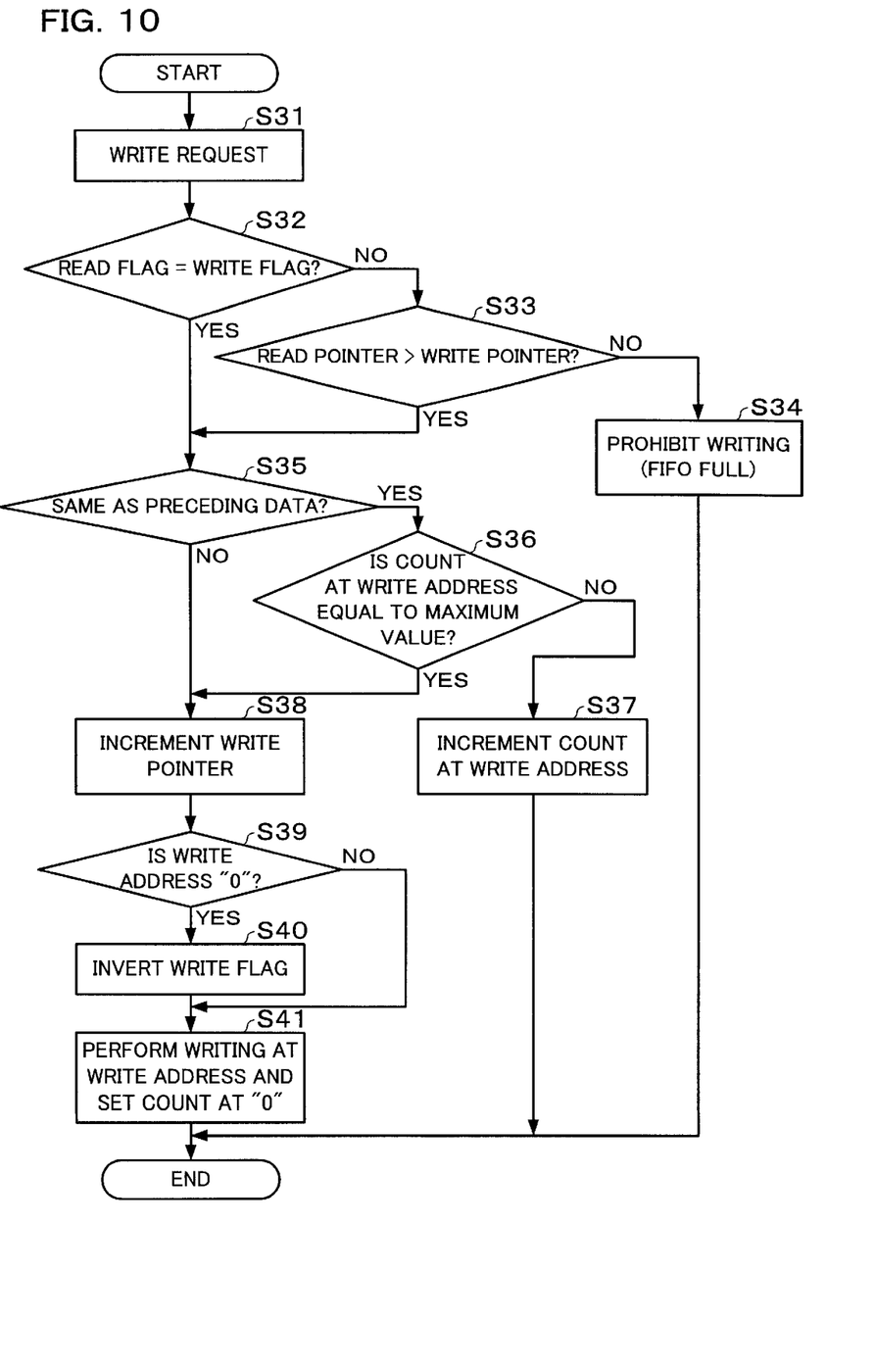
FIG. 10 is a flowchart showing a data writing operation of the first-in first-out storage device of FIG. 9.

The writing operation of the first-in first-out storage device 30 having the above configuration will be described below with reference to a flowchart of FIG. 10.

The management section 35 and the comparison section 11 start processing of input data in response to a write request signal (step S31).

First, the management section 35 judges whether the read flag and the write flag are identical (step S32). That is, at this step, it is judged whether the number of times the head memory address has been reached in reading is equal to the number of times the head memory address has been reached in writing. If the read flag and the write flag are different from each other, which means that the reading and the writing belong to different circulations, it is judged whether the read pointer indicates a larger address than the write pointer to prevent writing at an address where reading has not been performed yet (step S33). If the read pointer indicates the same address as the write pointer, which means that there exists no address where reading has finished but writing has not finished yet, a FIFO full signal is issued and writing is prohibited (step S34).

If it is found at step S33 that the read pointer indicates a larger address than the write pointer or if it is found at step S32 that the read flag and the write flag are identical, which means that there exists an address where writing can be performed (empty address), preparation for writing is started. First, it is judged based on the detection result output of the comparison section 11 whether data to be written is the same as data that was written immediately before (step S35). If the data to be written is the same as the data that was written immediately before, it is further judged whether the count value of the counter section at the write address indicated by the write pointer is equal to the maximum value (step S36). If the count value is not equal to the maximum value, the input data is written by incrementing the count value (step S37).

If it is found at step S36 that the count value at the write address is equal to the maximum value or if it is found at step S35 that the input data is not the same as the immediately preceding data, it is recognized that the data cannot be written by incrementing the counter. Therefore, the address indicated by the write pointer is incremented (step S38). If the write pointer indicated the tail address value immediately before the incrementing, the incrementing causes the write pointer to indicate the head address. If the address indicated by the write pointer returns to the head address in this manner, the write flag is inverted (steps S39 and S40). After the execution of step 40, the input data is written to the data section at the address indicated by the write pointer and the count value of the counter section is set at "0" (step S41).

Figure 11:
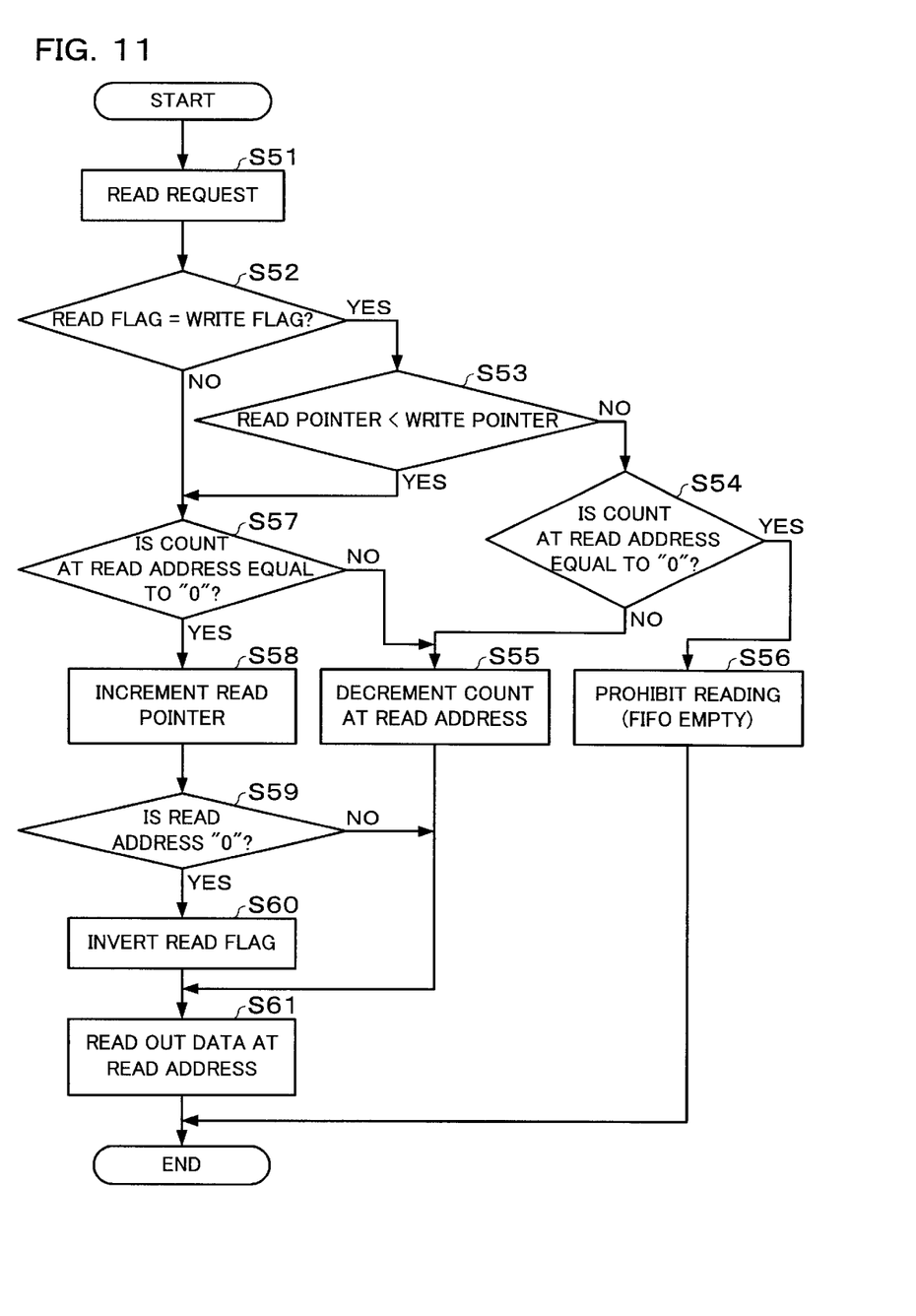
FIG. 11 is a flowchart showing a data reading operation of the first-in first-out storage device of FIG. 9.

Next, the reading operation of the first-in first-out storage device 30 will be described with reference to a flowchart of FIG. 11.

The management section 35 starts processing of input data in response to a read request signal (step S51).

First, the management section 35 judges whether the read flag and the write flag are identical (step S52). That is, the management section 35 judges whether the number of times the head memory address has been reached in reading is equal to the number of times the head memory address has been reached in writing. If the read flag and the write flag are identical, which means that the reading and the writing belong to the same circulation, it is judged whether the read pointer indicates a smaller address than the write pointer to prevent reading at an address where writing has not been performed yet or reading has already been performed (step S53). If the read pointer indicates the same address as the write pointer, which means that the read address has reached the write address, it is judged whether data remains as a count of the counter section by judging whether the count of the counter section at the read address is equal to "0" or not (step S54). If the count is equal to "0", which means that there does not remain data that has not been read out yet, a FIFO empty signal is issued and reading is prohibited (step S56). If it is found at step S54 that the count value of the counter section at the read address is not equal to "0", the count value is decremented (step S55).

If it is found at step S52 that the read flag is not the same as the write flag, which means that the writing belongs to a circulation ahead of a circulation of the reading and there necessarily remain data that have not been read out yet, preparation for reading is started. It is judged whether the count value of the counter section at the read address is equal to "0" or not. If the count value is not equal to "0", the count value is decremented (step S55).

If the count value of the counter section at the read address is equal to "0", no data remains at that address and hence the read pointer is incremented (step S58). If the read pointer indicated the tail address value immediately before the decrementing, the decrementing causes the read pointer to indicate the head address. If the address indicated by the read pointer returns to the head address in this manner, the read flag is inverted (steps S59 and S60). After the execution of step 60 or 55, data of the data section at the address indicated by the read pointer is read out (step S61).

In addition to the advantages of the first embodiment, this embodiment provides an advantage that whether the memory area has free space can be recognized correctly at the time of data writing. Further, this embodiment makes it possible to manage the memory area of a first-in first-out storage device having compression and expansion functions based on the relationship between the write address and the read address and count values of the counter sections.

What is claimed is:

1. A first-in first-out storage device comprising:

a memory area having a plurality of addresses and comprising a counter section and a data section corresponding to each of the addresses;

a comparison section which detects whether new input data and immediately preceding data are identical or not;

a writing control section which performs control based on a detection result of the comparison section, so that the new input data is written into the data section of the memory at a new address when the new input data and the immediately preceding input data are different from each other, and so that a count value of the counter section of the memory area at an address where the immediately preceding input data has been stored is incremented when the new input data and the immediately preceding input data are identical; and a management section comprising a write flag holding section for holding a write flag that indicates whether the writing belongs to an odd-numbered or even-numbered circulation in the memory area, a read flag holding section for holding a read flag that indicates whether the reading belongs to an odd-numbered or even-numbered circulation in the memory area, a write pointer holding section for holding a write pointer value that indicates a last-written address, and a read pointer holding section for holding a read pointer value that indicates a last-read address, wherein the management section outputs a signal for stopping a reading operation when the write and read flags are identical, the write and read pointer values are identical, and the count value of the counter section at the last-read address is equal to zero.

2. The first-in first-out storage device according to claim 1, wherein the writing control section performs control so that the new input data is written into the data section of the memory area at a new address when the new input data and the immediately preceding input data are identical and the count value of the counter section of the memory area at the address where the immediately preceding input data was written is equal to a maximum value.

3. The first-in first-out storage device according to claim 1, further comprising a reading control section which performs control so that data stored in the data section of the memory area at a read address is read out once when the count value of the counter section of the memory area at the read address is equal to a predetermined value, and so that data stored in the data section of the memory area at a read address is repeatedly read out a number of times that is determined based on the count value when the count value of the counter section of the memory area at the read address is other than the predetermined value.

4. The first-in first-out storage device according to claim 1, wherein the management section outputs a signal for stopping a writing operation when data is stored in the data section of the memory area at all the addresses and the new input data and the immediately preceding data are different from each other or the count value of the counter section at a last-written address is equal to a maximum value.

5. The first-in first-out storage device according to claim 1, wherein the management section outputs a signal for stopping a writing operation when data that has not been read out yet are stored in the data section of the memory area at all the addresses.

6. The first-in first-out storage device according to claim 1, wherein the management section outputs a signal for stopping a reading operation when the last-read address of the memory area is the same as the last-written address of the memory area and the count value of the counter section is equal to a predetermined value.

7. The first-in first-out storage device according to claim 2, wherein the management section outputs a signal for stopping a writing operation when data is stored in the data section of the memory area at all the addresses and the new input data and the immediately preceding data are different from each other or the count value of the counter section at a last-written address is equal to a maximum value.

8. The first-in first-out storage device according to claim 3, wherein the management section outputs a signal for stopping a writing operation when data is stored in the data section of the memory area at all the addresses and the new input data and the immediately preceding data are different from each other or the count value of the counter section at a last-written address is equal to a maximum value.

9. The first-in first-out storage device according to claim 2, wherein the management section outputs a signal for stopping a writing operation when data that has not been read out yet are stored in the data section of the memory area at all the addresses.

10. The first-in first-out storage device according to claim 3, wherein the management section outputs a signal for stopping a writing operation when data that has not been read out yet are stored in the data section of the memory area at all the addresses.

11. The first-in first-out storage device according to claim 2, wherein the management section outputs a signal for stopping a reading operation when the last-read address of the memory area is the same as the last-written address of the memory area and the count value of the counter section is equal to a predetermined value.

12. The first-in first-out storage device according to claim 3, wherein the management section outputs a signal for stopping a reading operation when the last-read address of the memory area is the same as the last-written address of the memory area and the count value of the counter section is equal to the predetermined value.

13. The first-in first-out storage device according to claim 1, wherein the management section outputs a signal for stopping a writing operation when the number of data that has been read in the memory area is different than the number of data that has been stored in the memory area and the last-read address of the memory area is the same as the last-written address of the memory area.

14. The first-in first-out storage device according to claim 1, wherein the management section outputs a signal for stopping a writing operation when the write and read flags are not identical and the write and read pointer values are identical.

* * * * *